Dec. 9, 1924.

J.S. BRENNAN

OVERFLOW PAN FOR GRIDS

Filed Nov. 17, 1922    2 Sheets-Sheet 1

1,518,728

Dec. 9, 1924.

J.S. BRENNAN 1,518,728

OVERFLOW PAN FOR GRIDS

Filed Nov. 17, 1922     2 Sheets-Sheet 2

Inventor:
John S. Brennan

Patented Dec. 9, 1924.

1,518,728

UNITED STATES PATENT OFFICE.

JOHN S. BRENNAN, OF MILWAUKEE, WISCONSIN.

OVERFLOW PAN FOR GRIDS.

Application filed November 17, 1922. Serial No. 601,511.

*To all whom it may concern:*

Be it known that I, JOHN S. BRENNAN, a citizen of the United States, and resident of Milwaukee, in the county of Milwaukee and State of Wisconsin, have invented certain new and useful Improvements in Overflow Pans for Grids; and I do hereby declare that the following is a full, clear, and exact description thereof.

This invention relates to overflow pans for stove grids and, although well suited to any type of burner stove, is particularly adapted to oil burner stoves.

In burner stoves it frequently happens that the liquid in boiling over, or otherwise overflowing the cooking utensil, extinguishes the flame. In addition to this, it often clogs up the burner and interferes with its subsequent efficient operation.

This invention is designed to overcome the above noted defects and, therefore, objects of this invention are to provide an overflow pan for grids which will prevent liquid from falling upon the burner, which will catch overflowing liquid and conduct it away from the burner, and which will not interfer with the efficient operation of the burner.

Further objects are to provide an overflow pan which is of simple and sturdy construction, which will operate with the usual types of stoves without requiring a complete redesigning of the stoves, and which may be produced at a minimum expense.

Embodiments of the invention are shown in the accompanying drawings in which.

Figure 1:
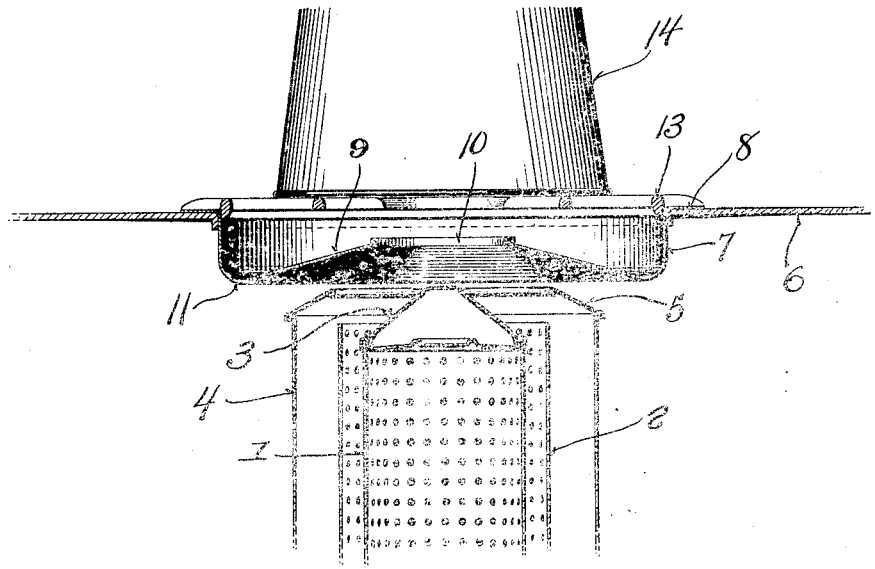
Figure 1 is a partial sectional elevation of a burner equipped with one form of the overflow pan, such view corresponding to a section on the line 1—1 of Figure 2.
Figure 2:
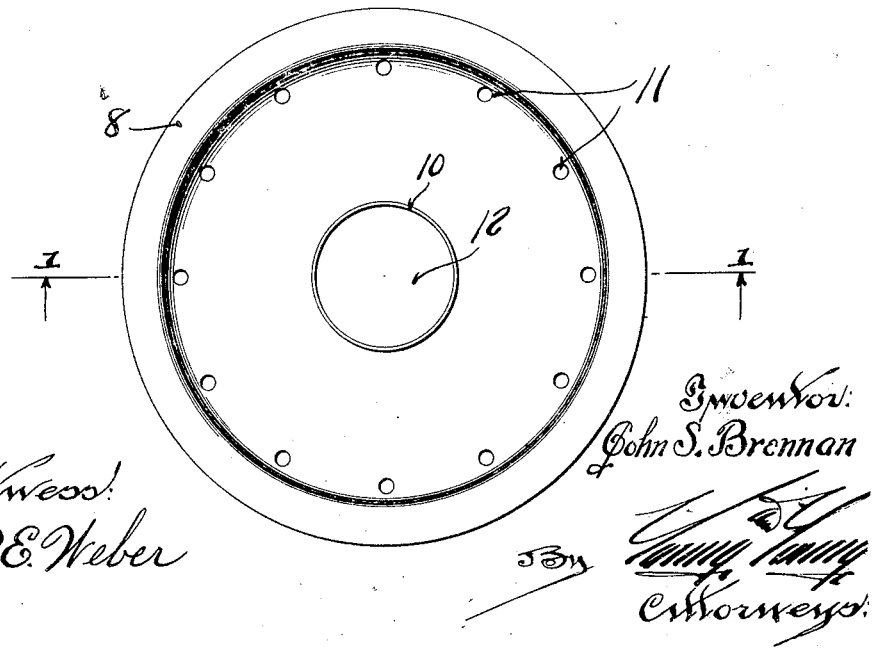
Figure 2 is a plan view of the burner pan detached from the rest of the apparatus.

Referring to Figures 1 and 2 it will be seen that the burner consists of the usual inner and outer drums 1 and 2 of perforated sheet material provided with the conical top portion 3 and with the outer shell 4, such outer shell having a frustro conical upper portion 5.

Within the opening above the burner formed in the stove top plate 6, the overflow pan is positioned. It comprises relatively short cylindrical side walls 7 terminating in an outwardly directed flange 8 which rests upon the top 6 and supports the pan in position. The bottom portion 9 of the pan is of frustro conical formation, and is provided with a relatively large central aperture surrounded by a short upwardly extending vertical flange 10. At the point where the frustro conical portion merges into the cylindrical side walls, a plurality of apertures 11 are provided and are arranged in a ring concentric with the central aperture 12 of the overflow pan.

In assembling the apparatus the overflow pan is positioned within the aperture in the top of the stove and the grid 13 is positioned above such overflow pan, it being appreciated that the fit between the grid and the table top opening is sufficiently loose to easily permit the insertion of the overflow pan. This grid, of course, is adapted to hold a utensil such as indicated in a fragmentary manner at 14, in position to be heated by the burner.

If, for any reason, the liquid boils over or overflows the side walls of the utensil 14, it falls into the overflow pan and is conducted along the slanting bottom to the lowest point, namely at the place where the apertures 11 are located. This liquid drains thru these apertures and falls beyond the outline of the burner, thereby preventing any interference with the operation of the burner.

Figure 3:
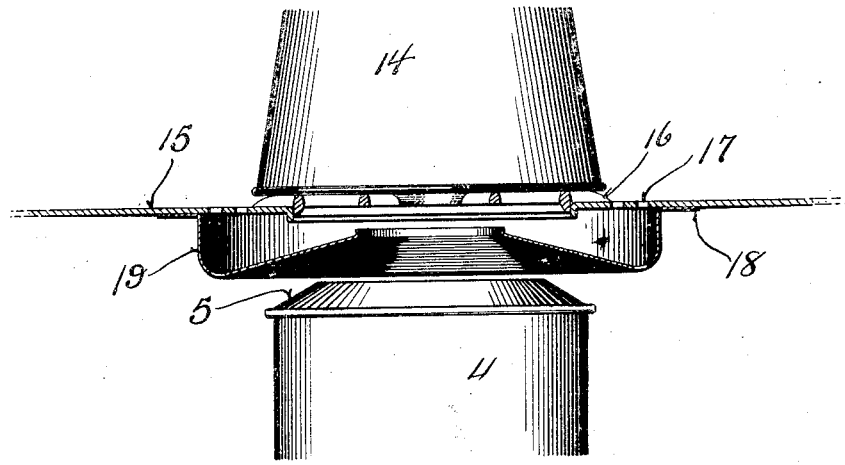
Figure 3 is a view corresponding to Figure 1 showing a permanently attached overflow pan.

In the form shown in Figure 3, the top 15 is provided with a relatively small aperture, within which the grid 16 is located, and is provided with a plurality of openings 17 around the main opening. In this case, the overflow pan has its flanges 18 spot-welded to the under surface of the table top. The pan, however, is formed in substantially the same manner as the overflow pan described in connection with Figures 1 and 2, except for the fact that its cylindrical side walls 19 are relatively shorter so as to properly position the pan with reference to the burner.

Figure 4:
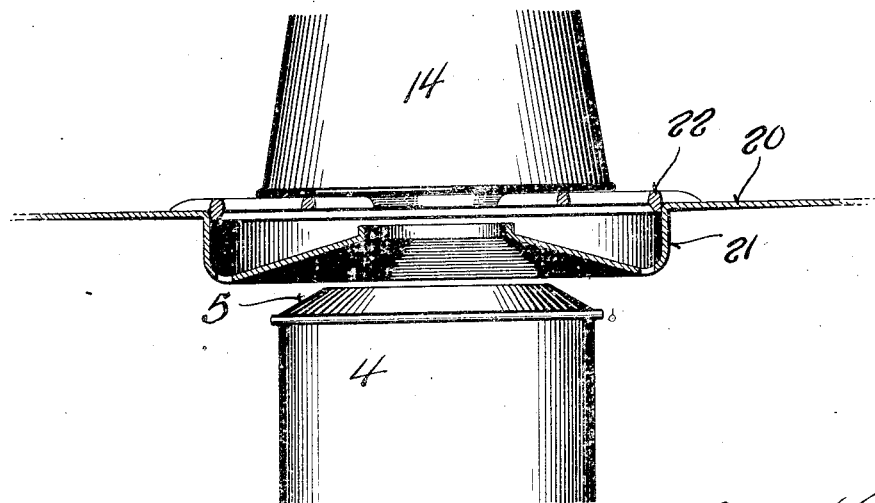
Figure 4 is a further view showing the overflow pan formed integrally with the top plate of the stove.

In the form shown in Figure 4, it will be seen that the top 20 is integral with the overflow pan, and that such top is merely depressed to form the cylindrical side walls 21 of the overflow pan, the rest of the pan being similar to those previously described. The grid 22 seats within the aperture provided by the overflow pan. This construction is adapted to be employed wherever the stove top is manufactured as a complete and distinct entity. The other forms, however, may be applied to existing types of stoves, if so desired, or may be separately supplied to stove dealers.

It will thus be seen that an overflow pan has been provided which catches and conducts any spilled liquid away from the burner and thereby prevents extinguishing of the flame and clogging of the burner, as has heretofore frequently been the case.

Although a few forms of the invention have been described in considerable detail, it is to be understood that the invention is to be limited only as set forth in the appended claim.

I claim:

The combination of a stove having an apertured top, a burner located below said top, an overflow pan removably positioned within said aperture and having an annular flange at its upper edge supported by said top, said pan having upwardly extending walls merging into said flange and having an upwardly bulged frusto conical bottom having a large central aperture above said burner and a series of apertures adjacent the outer portion of said bottom, and a grid carried by said stove top and extending across the aperture in said stove top and adapted to support a utensil.

In testimony that I claim the foregoing I have hereunto set my hand at Milwaukee, in the county of Milwaukee and State of Wisconsin.

JOHN S. BRENNAN.